(12) United States Patent
Peters (10) Patent No.: US 7,942,426 B2
(45) Date of Patent: May 17, 2011

(54) PIVOTAL/RIGID ACCESSORIES FOR POWER AND HAND TOOLS

(75) Inventor: Michael P. Peters, Lutherville, MD (US)

(73) Assignee: Black & Decker Inc., Newark, DE (US)

( * ) Notice: Subject to any disclaimer, the term of this patent is extended or adjusted under 35 U.S.C. 154(b) by 987 days.

(21) Appl. No.: 11/772,358

(22) Filed: Jul. 2, 2007

(65) Prior Publication Data

US 2008/0012245 A1    Jan. 17, 2008

Related U.S. Application Data

(60) Provisional application No. 60/830,424, filed on Jul. 12, 2006.

(51) Int. Cl.
*B23B 31/107* (2006.01)
*F16D 3/18* (2006.01)

(52) U.S. Cl. ............ 279/143; 279/22; 279/76; 279/144; 81/177.75; 81/177.8; 81/177.85; 464/159; 464/901

(58) Field of Classification Search ............... 279/22, 279/76, 143, 144; 81/177.7, 177.75, 177.8, 81/177.85, 177.9; 464/106, 158, 159, 901
See application file for complete search history.

(56) References Cited

U.S. PATENT DOCUMENTS

| | | |
|---|---|---|
| 61,581 A | 1/1867 | Taylor |
| 76,819 A | 4/1868 | Ross |
| 1,090,506 A | 3/1914 | Sprague |
| 1,094,603 A | 4/1914 | Scott |
| 1,398,116 A | 11/1921 | Root |
| 1,431,208 A | 10/1922 | Austin |
| 1,662,424 A | 3/1928 | Judge |
| 1,924,089 A | 8/1933 | Croessant |
| 2,114,807 A | 4/1938 | McCavitt |
| 2,354,184 A * | 7/1944 | Daniel .......................... 464/106 |
| 2,425,809 A | 8/1947 | Johnson |
| 2,471,974 A | 5/1949 | O'Malley |
| 2,526,105 A | 10/1950 | Adams |
| 2,687,025 A | 8/1954 | Wildhaber |
| 2,767,564 A | 10/1956 | Green |
| 2,854,829 A | 10/1958 | Porter |
| 3,232,075 A | 2/1966 | Wildhaber |
| 3,359,757 A | 12/1967 | Adams |

(Continued)

OTHER PUBLICATIONS

Off-line Driver, Kamasa Tools; http://www.offlinedriver.info/ (Jul. 12, 2006); pp. 1-2.

*Primary Examiner* — Eric A Gates
(74) *Attorney, Agent, or Firm* — Harness, Dickey & Pierce, P.L.C.

(57) ABSTRACT

A driving tool assembly includes a drive component adapted to be connected to a power tool or hand tool. A driven component is pivotally connected to the drive component and is adapted to receive a tool bit, drill bit, or otherwise provide a nut driver or socket wrench. A locking mechanism is provided for lockingly engaging the driven component to be in co-axial alignment with the drive component. The drive component includes a shaft or a mandrel having a driving shank formed or provided on one end thereof. The driving shank has a non-circular cross-section formed or defined by three or more curved and planar sidewalls. The number of sidewalls preferably includes three, four or six sidewalls, for engaging with a non-circular cavity of the driven component.

29 Claims, 6 Drawing Sheets

U.S. PATENT DOCUMENTS

| | | | |
|---|---|---|---|
| 3,367,141 A | 2/1968 | Baughman et al. | |
| 3,855,884 A | 12/1974 | McPeak | |
| 3,897,703 A | 8/1975 | Phipps | |
| 4,034,574 A | 7/1977 | Kuder | |
| 4,065,941 A | 1/1978 | Aoki et al. | |
| 4,108,027 A | 8/1978 | Lenker | |
| 4,114,401 A | 9/1978 | Van Hoose | |
| 4,436,005 A | 3/1984 | Hanson | |
| 4,464,141 A | 8/1984 | Brown | |
| 4,818,157 A * | 4/1989 | Kouvelis | 408/240 |
| 4,824,418 A | 4/1989 | Taubert et al. | |
| 4,833,950 A | 5/1989 | Moncada | |
| 4,938,731 A | 7/1990 | Nguyen et al. | |
| 5,007,880 A | 4/1991 | Walker | |
| 5,609,079 A | 3/1997 | Hashimoto et al. | |
| 5,738,586 A | 4/1998 | Arriaga | |
| 5,802,934 A | 9/1998 | Harriot et al. | |
| 5,918,512 A | 7/1999 | Habermehl et al. | |
| 6,105,473 A * | 8/2000 | Huang | 81/177.75 |
| 6,152,826 A | 11/2000 | Profeta et al. | |
| 6,290,606 B1 | 9/2001 | Hodson | |
| 6,490,955 B2 | 12/2002 | Chang-Kao et al. | |
| 6,575,062 B2 | 6/2003 | Hahn et al. | |
| 6,729,211 B1 | 5/2004 | Snow | |
| 6,976,411 B1 | 12/2005 | Yu | |
| 7,018,298 B1 | 3/2006 | Chiou et al. | |
| 7,228,767 B2 * | 6/2007 | Chang | 81/177.8 |
| 7,278,342 B1 * | 10/2007 | Chang | 81/177.75 |
| 7,363,839 B2 * | 4/2008 | Chiang | 81/177.75 |
| 7,430,943 B2 * | 10/2008 | Chiang | 81/177.7 |
| 7,481,136 B2 * | 1/2009 | Chiang | 81/177.75 |
| D589,319 S * | 3/2009 | Peters | D8/70 |
| 7,597,031 B2 * | 10/2009 | Chiang | 81/177.7 |
| 2005/0119057 A1 | 6/2005 | Rom et al. | |
| 2005/0143179 A1 | 6/2005 | Delaney et al. | |
| 2005/0235785 A1 * | 10/2005 | Chang | 81/177.75 |
| 2006/0260446 A1 * | 11/2006 | Chang | 81/177.75 |
| 2008/0168868 A1 * | 7/2008 | Yang | 81/177.75 |

* cited by examiner

PIVOTAL/RIGID ACCESSORIES FOR POWER AND HAND TOOLS

CROSS-REFERENCE TO RELATED APPLICATIONS

This application claims the benefit of U.S. Provisional Application No. 60/830,424, filed on Jul. 12, 2006.

FIELD

The present disclosure relates to a driving tool assembly, and more particularly, to a driving tool assembly having a locking universal mechanism.

BACKGROUND AND SUMMARY

Tool holders for rotary drivers such as drills are generally known in the art. Some tool holders directly couple bits, such as drilling bits or screw driving bits, to the rotary driver.

Tool holders generally include a drive body having a shank at one end and a socket at the other. The socket is configured to accommodate the bit and a retaining mechanism is coupled to the socket to releasably couple the bit or bit holder to the socket for rotation with the tool holder.

The driving tool assembly according to the present disclosure provides a pivoting mechanism that allow a tool bit to be driven at an angle relative to a drive axis. In particular, a driving tool assembly according to the present disclosure includes a drive component adapted to be connected to a power tool or hand tool. A driven component is pivotally connected to the drive component and is adapted to receive a tool bit, drill bit, or otherwise provide a nut driver or socket wrench. A locking mechanism is provided for lockingly engaging the driven component to be in co-axial alignment with the drive component. The drive component includes a shaft or a mandrel having a driving shank formed or provided on one end thereof. The driving shank has a non-circular cross-section formed or defined by three or more curved and planar sidewalls. The number of sidewalls preferably includes three, four or six sidewalls, for engaging with a non-circular cavity of the driven component.

DRAWINGS

The drawings described herein are for illustration purposes only and are not intended to limit the scope of the present disclosure in any way.

DETAILED DESCRIPTION

Figure 1:
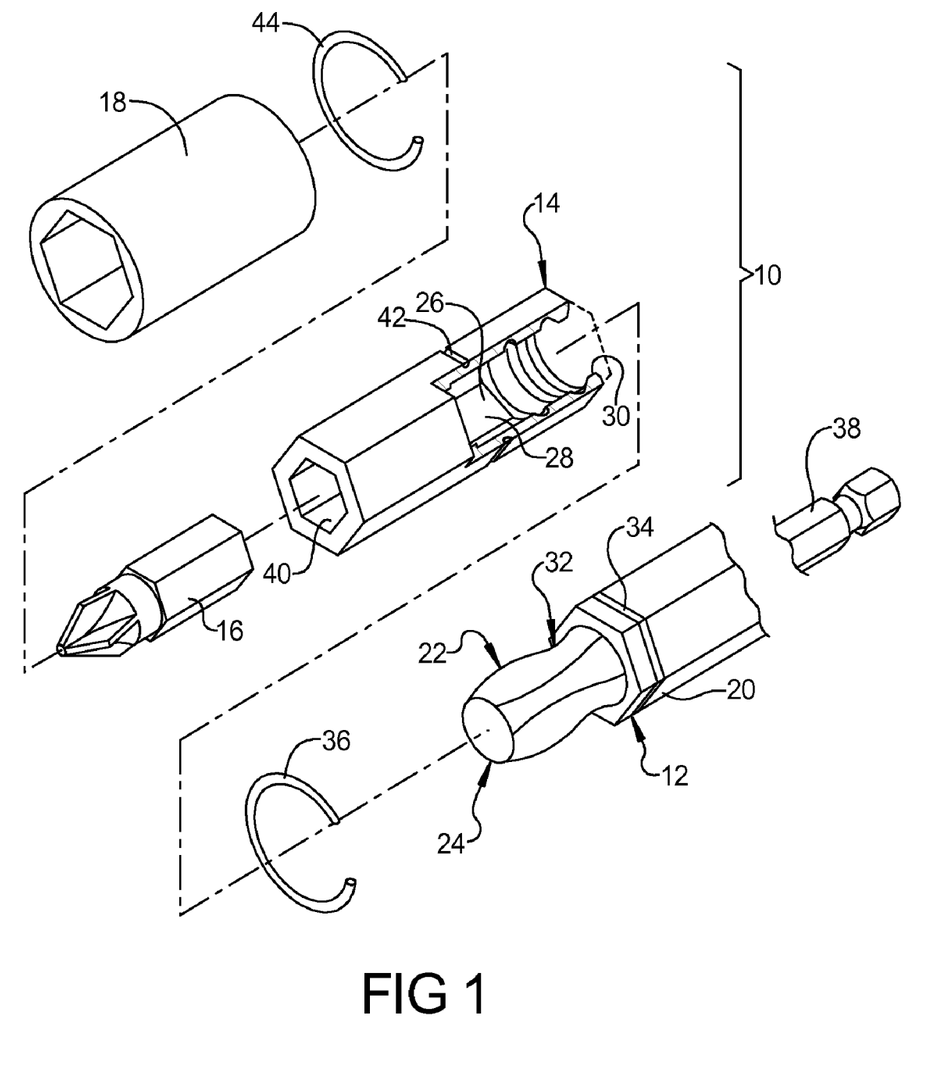
FIG. 1 is an exploded perspective view of a driving tool assembly according to the principles of the present disclosure.

With reference to FIG. 1, the driving tool assembly 10 includes a drive component 12 adapted to be connected to a power tool or hand tool. A driven component 14 is pivotally connected to the drive component 12 and is adapted to receive a tool bit, drill bit 16, or otherwise provide a nut driver or socket wrench. A locking mechanism 18 is provided for lockingly engaging the driven component 14 to be in co-axially alignment with the drive component 12. The drive component 12 includes a shaft or a mandrel 20 having a driving shank 22 formed or provided on one end 22 thereof. The driving shank 22 has a non-circular cross-section formed or defined by three or more curved and planar sidewalls 24. The number of sidewalls preferably includes three, four or six sidewalls, for engaging with a non-circular cavity 26 of the driven component 14.

Figure 3:
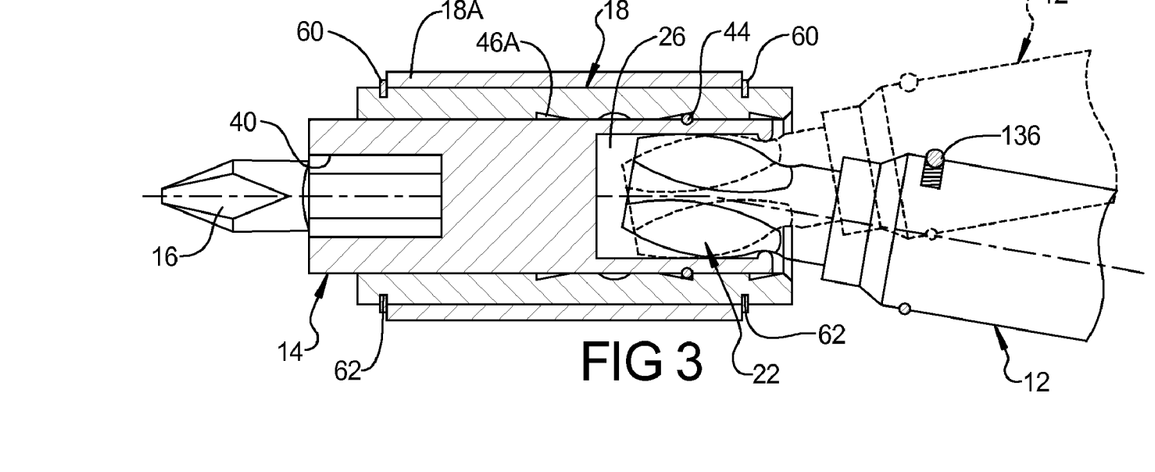
FIG. 3 is a cross-sectional view of an alternative driving tool assembly, shown in a pivoted position.

The non-circular cavity 26 of the driven component 14 is defined by three or more planar sidewalls 28, and preferably includes three, four or six sidewalls. The end portion 30 of cavity 26 is preferably crimped or swaged in order to maintain the driven component 14 in engagement with the drive component 12 by encapsulating the driving shank 22 within the cavity 26. The drive component 12 further includes a narrowed neck portion 32 formed or provided therein located between the mandrel 20 and driving shank 22. The mandrel 20 and the interior of the sleeve 18 can be provided with a square, pentagon, hexagon, or octagon shape, or alternatively can be provided with at least one flat or can be otherwise configured to provide direct drive torque between the sleeve 18 and the mandrel 20 when the sleeve 18 engages the mandrel 20. The sleeve 18 can also be provided with a secondary rotatable sleeve 18A rotatably mounted to an outer surface of sleeve 18, as shown in FIG. 3. The sleeve 18A can be retained by retaining rings 60, each of which is received in a corresponding groove 62 in the exterior of the sleeve 18. The secondary rotatable sleeve 18A allows a user to hold the sleeve 18A while the tool assembly is being driven. Alternatively, the interior of the sleeve 18 can be cylindrical and allowed to freely rotate relative to the drive and driven components 12,14 which can each be provided with cylindrical outer perimeters.

As yet another alternative, the sleeve 18 can be designed to be allowed to rotate freely relative to the drive and driven components when the sleeve is in the unlocked position, but when moved to the locked position, the sleeve can be designed to engage the drive and driven components so as to be able to transmit torque therebetween.

The mandrel 20 includes a recessed groove 34 which receives a detent ring 36 therein for providing a detent for selectively holding the sleeve 18 in the locking position, as will be described in greater detail herein. The mandrel 20 is provided with a shank portion 38 which can be adapted to be connected to a power tool or hand tool. As shown in FIG. 1, the shank portion 38 is hexagonal in cross-section and includes a ball groove therein. However, it should be understood that other known shank configurations can be used.

Figure 2:
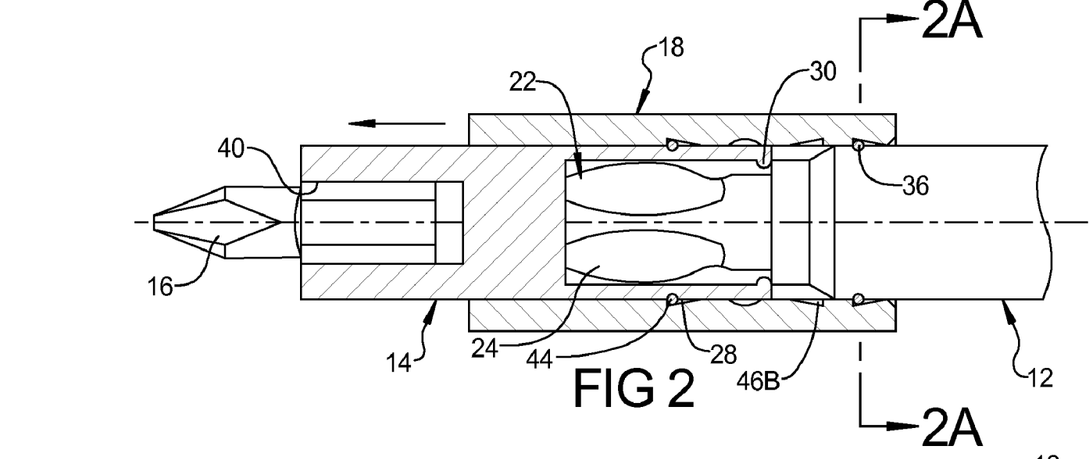
FIG. 2 is a cross-sectional view of the driving tool assembly of FIG. 1, shown in a locked position.

The driven component 14 can take on many forms. As shown in FIG. 1, the driven component 14 includes a hexagonal bit-receiving bore 40 in the end thereof for receiving a bit 16. In the embodiment shown in FIG. 1, the locking mechanism 18 is in the form of a sleeve which is received on the driven component 14. The driven component 14 includes an external groove 42 which receives a retaining ring 44 therein for limiting axial moment of the sleeve 18. As best shown in FIG. 2, the sleeve 18 includes two inner-peripheral recesses 46A, 46B for engaging the retaining ring 44. As shown in FIG. 2, when the sleeve 18 is in a locking position, the retaining ring 44 is received in forward inner-peripheral recess 46A and, as shown in FIG. 3, when the sleeve 18 is moved to the unlocked position, the retaining ring 44 is received in the rearward inner-peripheral recess 46B.

Figure 2A:
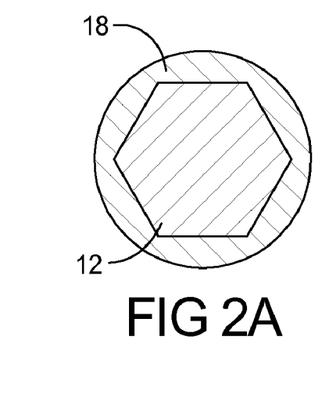
FIG. 2A is a cross-sectional view taken along line 2A-2A of FIG. 2.

Preferably, the sleeve 18 includes at least one flat portion or other means for transmitting driving torque from the drive component 12 to the driven component 14. For example, as shown in FIG. 2A, a hexagonal cross-section is shown. Thus, when the sleeve 18 is slid to the rearward position, as shown in FIG. 2, the sleeve drivingly connects the drive component 12 and driven component 14, while also preventing the driven component 14 from pivoting relative to the drive component 12. The retaining ring 36 received in recess groove 34 provides a detent for maintaining the sleeve 18 in the locked position, as shown in FIG. 2.

Figure 13:
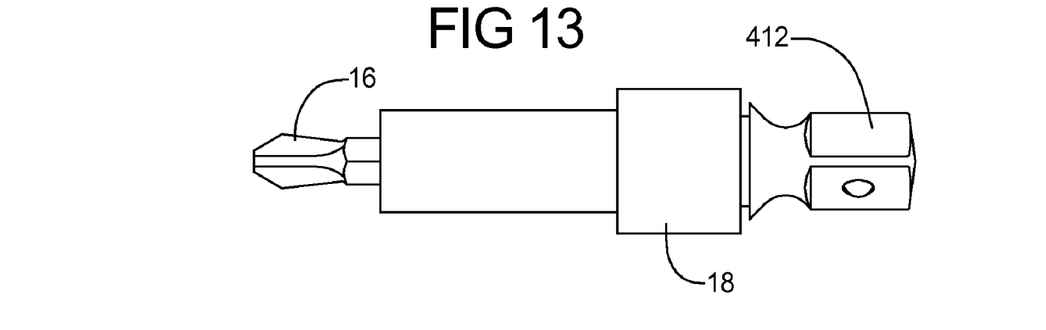
FIG. 13 is a side view of an alternative driving tool assembly, shown in a locked position.

When the drive assembly is desired to be used for driving the driver bit or a drill bit at an angle relative to the mandrel 20, the locking sleeve 18 can be moved to the forward, unlocked, position to allow the driven component 14 to be pivoted relative to the drive component 12, as illustrated in FIG. 13. Rotation of the drive component 12 causes the driven component 14 to rotate therewith while the driving shank 22 and non-circular cavity 36 transmit driving torque between the drive component 12 and driven component 14.

Figure 4:
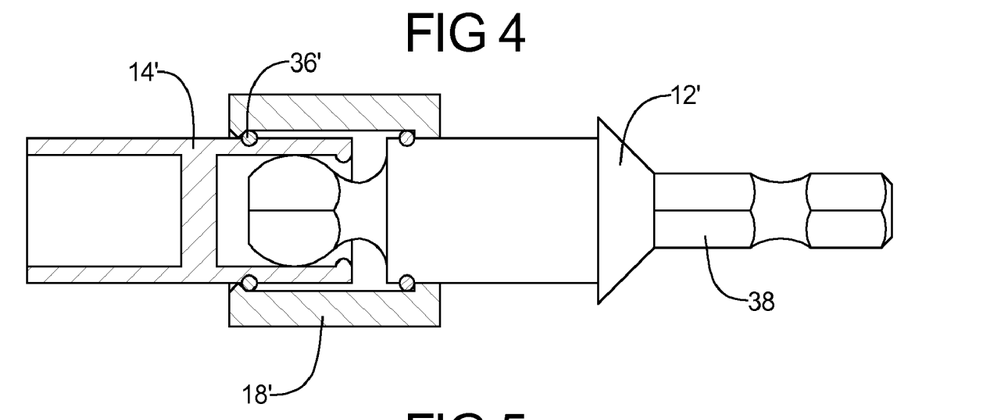
FIG. 4 is a cross-sectional view of an alternative driving tool assembly, shown in a locked position.
Figure 5:
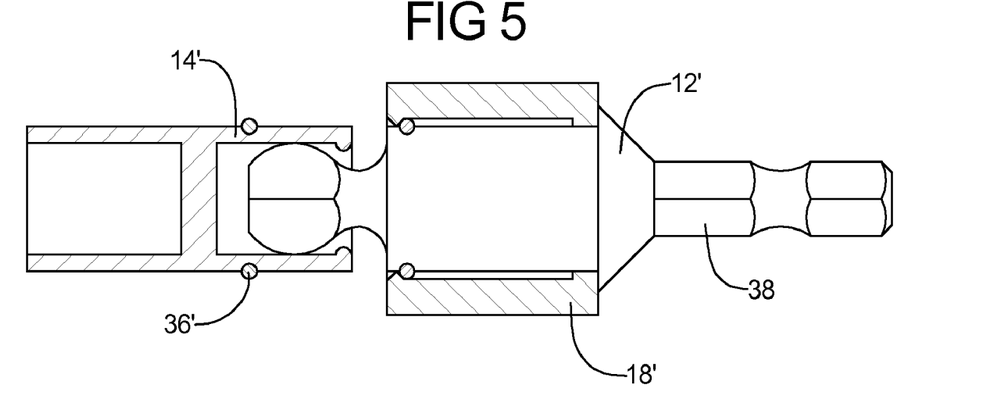
FIG. 5 is a cross-sectional view of the driving tool assembly of FIG. 4, with the locking sleeve moved to a disengaged position.
Figure 6:
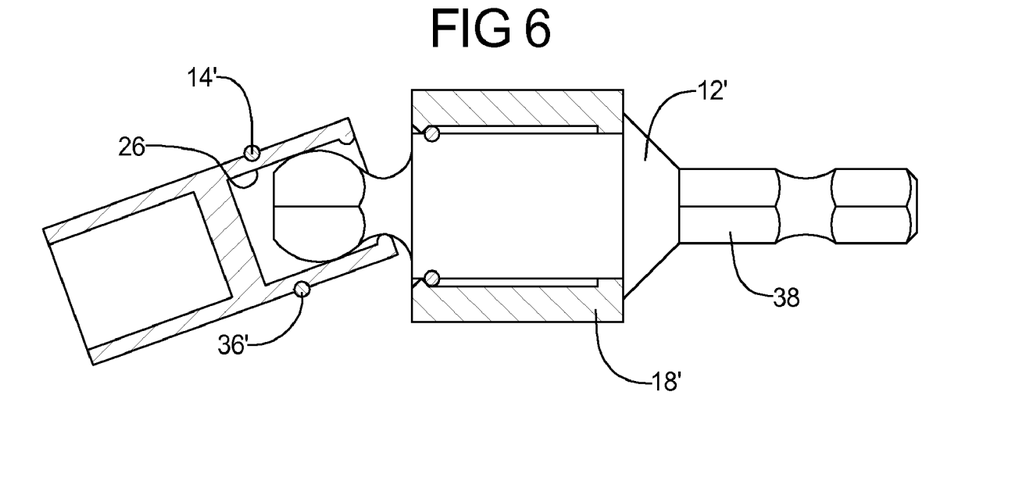
FIG. 6 is a cross-sectional view of the driving tool assembly of FIG. 4 shown in a pivoted position.

In the embodiments shown in FIGS. 1-3, the locking mechanism 18 is shown provided on the driven component 14. As shown in FIGS. 4-6, the locking mechanism 18' can also be mounted to the drive component 12' and can be moved into locking engagement with the driven component 14'. As shown in FIG. 4, the locking mechanism 18' is engaged with a detent 36', provided on the driven component 14', for maintaining the locking sleeve 18' in the locked position. As shown in FIG. 5, the locking sleeve 18' can be moved rearward to an unlocked position. As shown in FIG. 6, with the locking sleeve 18' in an unlocked position, the driven component 14' can be pivoted relative to the drive component 12'.

It should be noted that the detent mechanism 36, as disclosed with reference to FIGS. 1-6, can take on other forms, such as a ball detent and spring assembly 136, as shown in FIG. 3.

Figure 7:
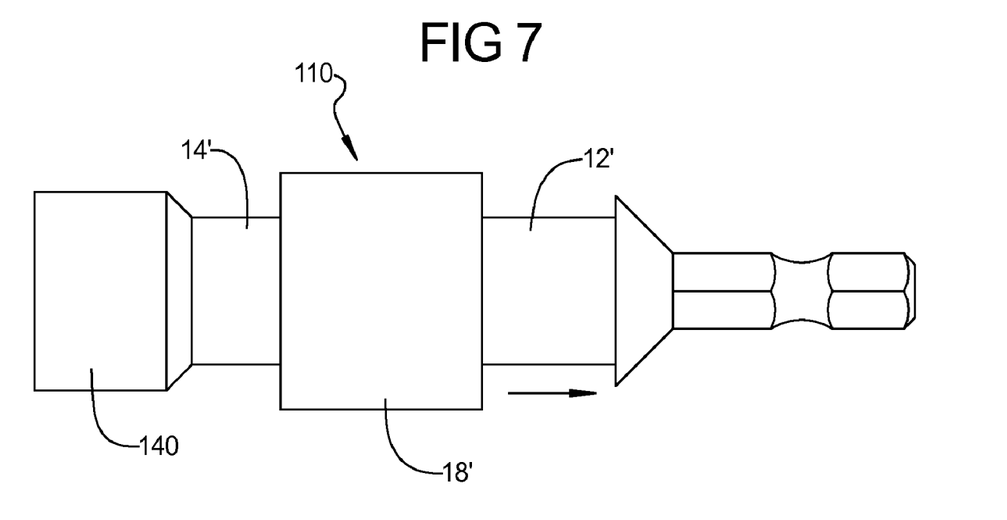
FIG. 7 is a side view of an alternative nut-driving tool assembly, shown in a locked position.

With reference to FIG. 7, a nut driver assembly 110 is provided including a drive component 12' connected to a driven component 14' via a universal joint, as described above and including a locking mechanism 18' for locking the universal joint. The driven component 14' includes a nut driver portion 140, having an internal hex-shaped bore adapted for driving a nut or a hex-shaped head of a screw.

Figure 8:
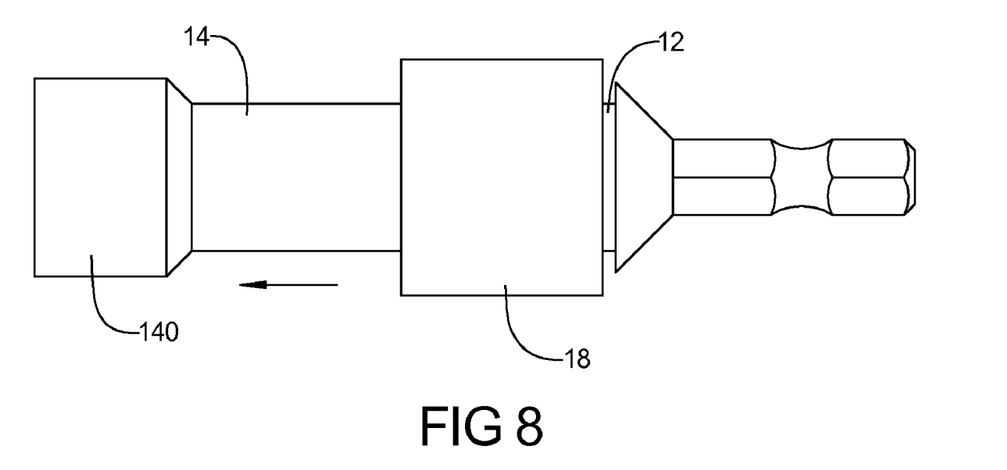
FIG. 8 is a side view of an alternative nut-driving tool assembly, shown in a locked position.

FIG. 8 also discloses a nut driver assembly 110 wherein the locking sleeve 18 is mounted to the driven component 14 in the manner as illustrated in FIGS. 1-3. The driven component 14 again includes a nut driver portion 140 for driving nuts or hex-shaped heads of screws or the like.

Figure 9:
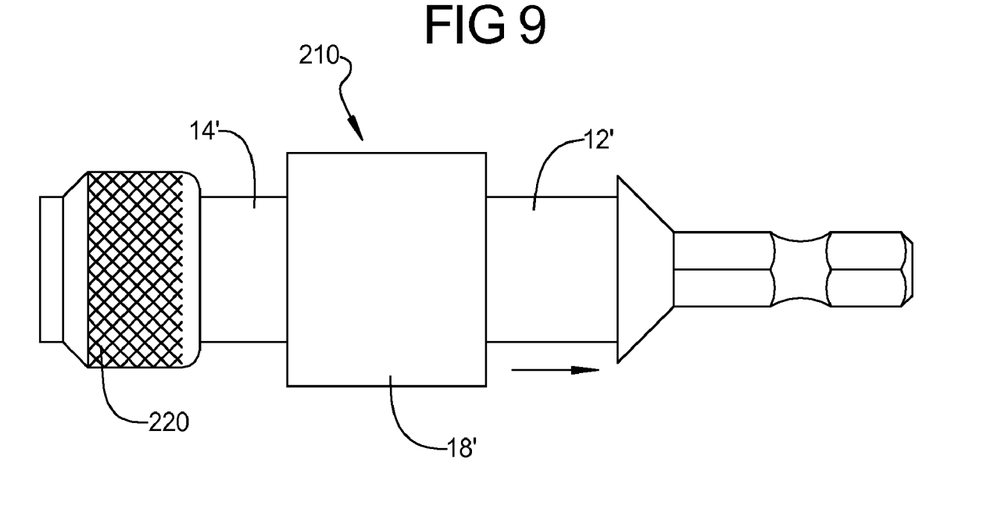
FIG. 9 is a side view of an alternative bit driving tool assembly, shown in a locked position.
Figure 10:
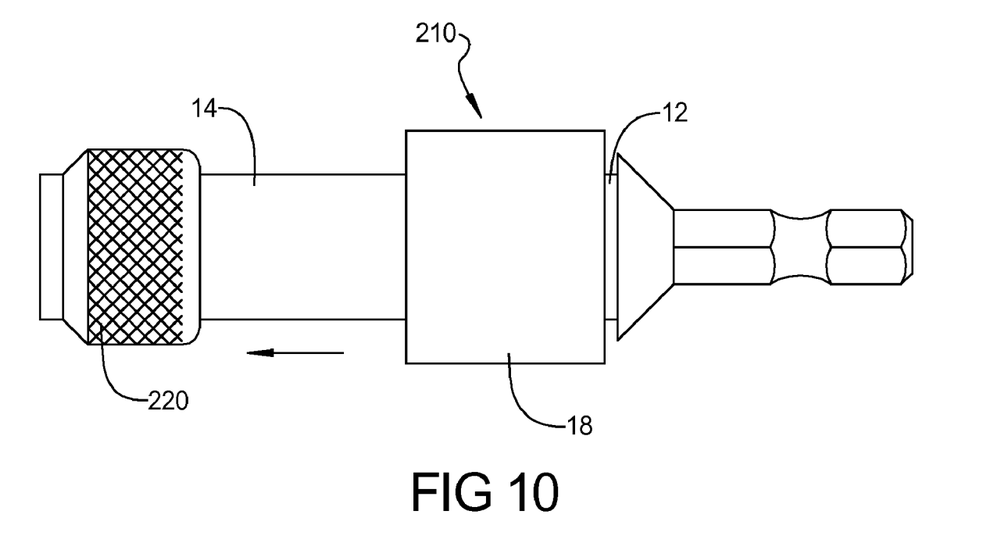
FIG. 10 is a side view of an alternative driving tool assembly, shown in a locked position.

With reference to FIG. 9, a quick connect bit driver assembly is shown provided with a universal joint and locking mechanism. The assembly 210 includes a drive component 12', a driven component 14' connected to the drive component 12' by a universal joint, as disclosed in FIGS. 4-6. A locking sleeve 18' is provided for selectively locking the universal joint. A quick connect sleeve 220 is provided for providing a quick connect and release mechanism for receiving tool bits and drill bits. The quick connect mechanism can be of many known types of devices including a ball detent device, an O-ring locking device, a spring biased pin-type locking device or other known mechanism. In FIG. 10, the quick connect assembly with universal joint is shown including the locking sleeve 18 mounted to the driven component 14.

Figure 11:
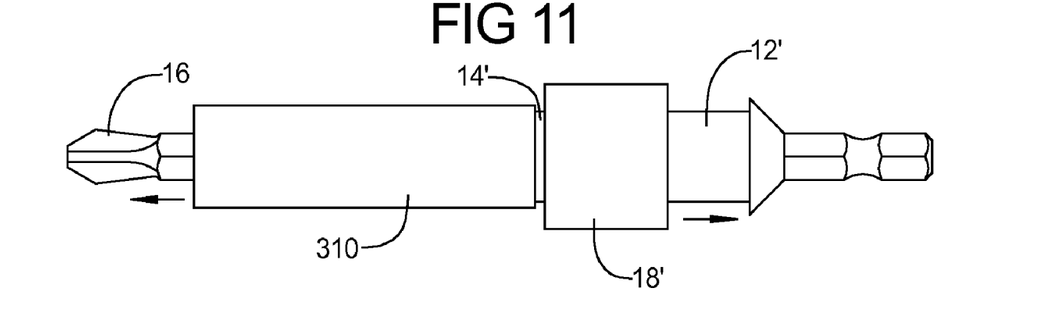
FIG. 11 is a side view of a drive guide, bit driving tool assembly, shown in a locked position.
Figure 12:
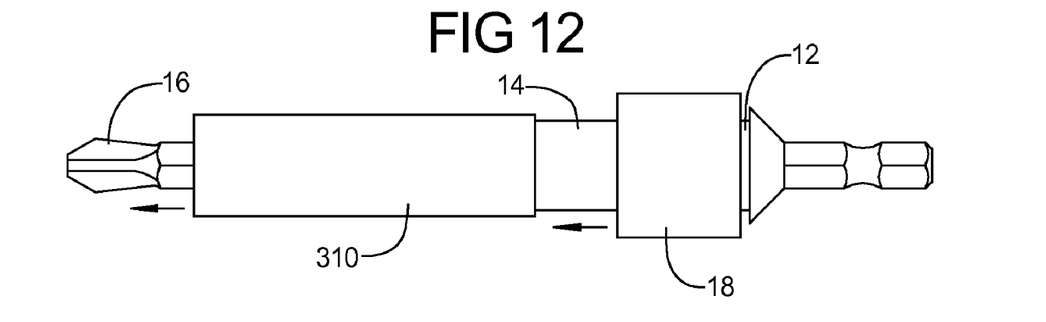
FIG. 12 is a side view of an alternative drive guide, bit driving tool assembly, shown in a locked position.

In FIG. 11, a drive guide assembly is provided with a lockable universal joint. In particular, the drive component 12' is connected to a driven component 14' by a universal joint connection, as shown in FIGS. 4-6, and a locking sleeve 18' is provided for selectively locking the universal joint. The driven component 14' includes a drive guide sleeve 310 which can be axially extended beyond the bit 16 to provide a guide for a screw. The sleeve 310 is movable axially relative to the driven component in a manner that is known on existing screw drive guides. In FIG. 12, the magnetic drive guide is shown with the locking sleeve 18 provided on the driven component 14.

With reference to FIG. 13, it is noted that the drive component 412 can be provided with alternative drive shanks, including a square-shaped drive shank 412, as illustrated. In this embodiment, the locking mechanism 18 and driven component 14 can remain unchanged and can include a universal connection between the drive component 412 and driven component 14, as described in detail above.

Figure 14:
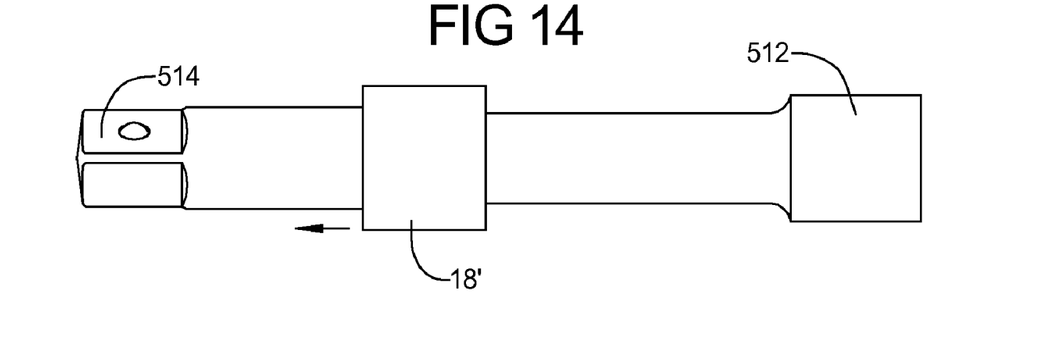
FIG. 14 is a side view of an alternative driving tool assembly, shown in a locked position.

As shown in FIG. 14, the universal joint and locking mechanism 18 can be implemented on an extension device or other universal drive apparatus including a female socket end 512 as a drive component, and a male socket component 514 as a driven component. It should be noted that the adapter, as shown, can provide a reduction device. For example, providing a ⅜ inch head 514 at one end of the adaptor and allowing the female portion 512 to receive a ½ inch drive. Therefore, a ½ inch to ⅜ inch adapter is provided with a universal joint and locking mechanism 18 provided therein.

In the present application, several features have been shown in the various embodiments. It should be understood that, although not shown, the features of the various embodiments can be combined with one another.

What is claimed is:

1. A driving tool assembly, comprising: a drive component, including a shaft having a driving shank provided on one end thereof, said driving shank having a non-circular cross-section defined by at least three curved sidewalls; a driven component including a first end having a non-circular cavity pivotally connected to the drive component and a second end having a hexagonal aperture; and a locking mechanism movable between a disengaged and an engaged position for lockingly engaging the driven component to be in co-axial alignment with the drive component, wherein said locking mechanism includes at least one flat for delivering drive torque from said drive component to said driven component when said locking mechanism is in said engaged position.

2. The driving tool assembly according to claim 1, wherein said locking mechanism includes a locking sleeve slidably received on one of said drive component and said driven component.

3. The driving tool assembly according to claim 2, further comprising a secondary sleeve rotatably mounted to said locking sleeve.

4. The driving tool assembly according to claim 2, wherein the other of said drive component and driven component includes a detent mechanism for holding said locking sleeve in said engaged position.

5. The driving tool assembly according to claim 1, wherein said driven component includes a quick connect bit driver assembly mounted thereon for releasably engaging a bit therein.

6. The driving tool assembly according to claim 1, wherein said drive component includes a driven shank portion having a hexagonal cross-section.

7. The driving tool assembly according to claim 1, wherein said drive component includes a driven shank portion having a square cross-section.

8. The driving tool assembly according to claim 1, wherein said drive component includes a driven shank portion having a female receiver portion.

9. The driving tool assembly according to claim 8, wherein said driven component includes a male socket portion and said female receiver portion of said drive component is a female socket portion.

10. The driving tool assembly according to claim 9, wherein said male socket portion includes a smaller exterior diameter than an interior diameter of said female socket portion.

11. The driving tool assembly according to claim 1, wherein said driven component includes a drive guide assembly having an axially slidable sleeve mounted thereon.

12. A driving tool assembly, comprising: a drive component and a driven component, one of said drive component and said driven component including a shaft having a driving shank provided on one end thereof, said driving shank having a non-circular cross-section defined by at least three curved sidewalls, the other of said drive component and said driven component including an end having a non-circular cavity pivotally connected to the drive component, said driven component including a second end having a hexagonal aperture; and a locking mechanism movable between a disengaged and an engaged position for lockingly engaging the driven component to be in co-axial alignment with the drive component, wherein said locking mechanism includes at least one flat for delivering drive torque from said drive component to said driven component when said locking mechanism is in said engaged position.

13. The driving tool assembly according to claim 12, wherein said locking mechanism includes a locking sleeve slidably received on one of said drive component and said driven component.

14. The driving tool assembly according to claim 13, further comprising a secondary sleeve rotatably mounted to said locking sleeve.

15. The driving tool assembly according to claim 13, wherein the other of said drive component and driven component includes a detent mechanism for holding said locking sleeve in said engaged position.

16. The driving tool assembly according to claim 12, wherein said driven component includes a quick connect bit driver assembly mounted thereon for releasably engaging a bit therein.

17. The driving tool assembly according to claim 12, wherein said drive component includes a driven shank portion having a hexagonal cross-section.

18. The driving tool assembly according to claim 12, wherein said drive component includes a driven shank portion having a square cross-section.

19. The driving tool assembly according to claim 12, wherein said drive component includes a driven shank portion having a female receiver portion.

20. The driving tool assembly according to claim 19, wherein said driven component includes a male socket portion and said female receiver portion of said drive component is a female socket portion.

21. The driving tool assembly according to claim 20, wherein said male socket portion includes a smaller exterior diameter than an interior diameter of said female socket portion.

22. The driving tool assembly according to claim 12, wherein said driven component includes a drive guide assembly having an axially slidable sleeve mounted thereon.

23. A driving tool assembly, comprising: a drive component and a driven component, one of said drive component and said driven component including a shaft having a driving shank provided on one end thereof, said driving shank having a non-circular cross-section defined by at least three curved sidewalls, the other of said drive component and said driven component including an end having a non-circular cavity pivotally connected to the drive component, said driven component including a second end having a male socket component; and a locking mechanism movable between a disengaged and an engaged position for lockingly engaging the driven component to be in co-axial alignment with the drive component, wherein said locking mechanism includes at least one flat for delivering drive torque from said drive component to said driven component when said locking mechanism is in said engaged position.

24. The driving tool assembly according to claim 23, wherein said locking mechanism includes a locking sleeve slidably received on one of said drive component and said driven component.

25. The driving tool assembly according to claim 24, further comprising a secondary sleeve rotatably mounted to said locking sleeve.

26. The driving tool assembly according to claim 24, wherein the other of said drive component and driven component includes a detent mechanism for holding said locking sleeve in said engaged position.

27. The driving tool assembly according to claim 23, wherein said drive component includes a driven shank portion having a female receiver portion.

28. The driving tool assembly according to claim 27, wherein said female receiver portion of said drive component is a female socket portion.

29. The driving tool assembly according to claim 28, wherein said male socket portion includes a smaller exterior diameter than an interior diameter of said female socket portion.

* * * * *